United States Patent
Thompson et al.

(10) Patent No.: US 11,465,564 B2
(45) Date of Patent: Oct. 11, 2022

(54) PARCEL SHELF FOR SOUND MANAGEMENT IN VEHICLE

(71) Applicant: Honda Motor Co., Ltd., Tokyo (JP)

(72) Inventors: Michael L. Thompson, Ostrander, OH (US); Edward W. Bach, Marysville, OH (US); Christopher D. Hinz, Worthington, OH (US); Aniruddha A. Joshi, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 806 days.

(21) Appl. No.: 16/423,473

(22) Filed: May 28, 2019

(65) Prior Publication Data

US 2020/0377023 A1    Dec. 3, 2020

(51) Int. Cl.
*B60R 5/04* (2006.01)
*B60R 13/08* (2006.01)

(52) U.S. Cl.
CPC .......... *B60R 5/044* (2013.01); *B60R 13/0823* (2013.01)

(58) Field of Classification Search
CPC . B60R 5/044; B60R 13/0268; B60R 11/0217; B60R 13/0823; B32B 5/024; B32B 27/20
USPC .......... 181/284–290, 198–199, 210
See application file for complete search history.

(56) References Cited

U.S. PATENT DOCUMENTS

| | | | | |
|---|---|---|---|---|
| 3,324,968 A * | 6/1967 | De Coye De Castelet | ............ | B60R 13/0268 181/211 |
| 4,551,849 A * | 11/1985 | Kasai | ............ | B60R 11/0223 381/86 |
| 5,498,050 A * | 3/1996 | Maruyama | ............ | B60R 5/044 296/37.16 |
| 5,685,591 A * | 11/1997 | Simplicean | ............ | B60R 11/02 296/37.16 |
| 5,842,736 A * | 12/1998 | Hung | ............ | B60R 5/044 296/187.05 |
| 5,964,491 A * | 10/1999 | Marsh | ............ | B60R 5/044 296/37.16 |
| 6,258,438 B1 * | 7/2001 | Loveland | ............ | B32B 5/26 296/37.16 |
| 6,926,784 B2 * | 8/2005 | Bock | ............ | B60R 13/08 156/244.11 |

(Continued)

FOREIGN PATENT DOCUMENTS

| | | |
|---|---|---|
| EP | 1447277 A1 | 8/2004 |
| JP | H08-238987 A | 9/1996 |
| JP | 2004-025945 A | 9/2004 |

*Primary Examiner* — Terrell L McKinnon
*Assistant Examiner* — Michael McDuffie
(74) *Attorney, Agent, or Firm* — Gregory J Burke; American Honda Motor Co., Inc.

(57) ABSTRACT

A parcel shelf for a vehicle includes a tray disposed between a trunk area and a cabin area of the vehicle and a soundproofing partition extending laterally between two distal portions of the tray such that the tray is partitioned into a forward region and a rearward region. The forward region includes openings and each of these openings is sealed to limit passage of sound from the trunk area into the cabin area through the forward region. The soundproofing partition is configured such that the sound from the trunk area reaching the rearward region is redirected along an extended sound pathway before entering the cabin area. A resulting sound level entering the cabin area is reduced below a defined threshold level.

20 Claims, 8 Drawing Sheets

(56) References Cited

U.S. PATENT DOCUMENTS

| | | | | |
|---|---|---|---|---|
| 6,971,475 | B2* | 12/2005 | Tompson | B60R 13/0815 |
| | | | | 181/290 |
| 7,080,712 | B2* | 7/2006 | Tsuiki | B60R 13/083 |
| | | | | 181/290 |
| 7,182,172 | B2* | 2/2007 | Albin, Jr. | D04H 1/74 |
| | | | | 181/290 |
| 7,971,683 | B2* | 7/2011 | Bayle | B60R 13/0846 |
| | | | | 181/290 |
| 8,322,774 | B2 | 12/2012 | Hofmann | |
| 9,248,781 | B2* | 2/2016 | Oppliger | B60R 5/044 |
| 9,630,567 | B1* | 4/2017 | Shahidi | B60J 1/2063 |
| 9,840,202 | B1* | 12/2017 | Ranga | B60R 5/044 |
| 10,807,542 | B2* | 10/2020 | Kato | B60R 13/0268 |
| 2004/0075290 | A1* | 4/2004 | Campbell | B60R 13/083 |
| | | | | 296/39.3 |
| 2007/0137926 | A1* | 6/2007 | Albin | B60R 13/0815 |
| | | | | 181/290 |
| 2008/0169678 | A1* | 7/2008 | Ishida | B60R 5/044 |
| | | | | 264/516 |
| 2008/0310668 | A1* | 12/2008 | Koch | H04R 1/026 |
| | | | | 381/389 |
| 2011/0277911 | A1* | 11/2011 | Allen | B62D 29/002 |
| | | | | 181/284 |
| 2013/0118831 | A1* | 5/2013 | Kawai | E04B 1/8409 |
| | | | | 181/290 |
| 2017/0210306 | A1 | 7/2017 | Tavakoli Targhi et al. | |
| 2017/0259745 | A1 | 9/2017 | Schaefer | |

* cited by examiner

PRIOR-ART

PARCEL SHELF FOR SOUND MANAGEMENT IN VEHICLE

BACKGROUND

Various techniques are being developed to limit the transmission of sound (e.g., road noise) from a trunk area into a cabin area of a vehicle. Typically, in sedan-type vehicles, sound treatment techniques are applied to a parcel shelf located between the trunk and the cabin area to make the cabin area quiet. Conventionally, a sound deadening material is applied on bottom of the parcel shelf lining. In another conventional way, a fabric cover lining is applied on the bottom of the parcel shelf lining, where an additional sound deadening material may be further applied to the fabric cover lining. However, both the conventional solutions are expensive, which may be undesired for a manufacture of the vehicle. In certain high segment sedan vehicles, a sound deadening insulator layer (such as dashboard insulator) is also provided on top position of the parcel shelf to control the movement of the sound from the trunk area to the cabin area. However, the sound deadening insulator layer covering the top area of the parcel shelf is also not cost effective. Thus, an advanced and cost-effective technique is desired on the parcel shelf of the vehicle to manage the sound entering the cabin area from the trunk area.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides a parcel shelf for a vehicle which may include a tray disposed between a trunk area and a cabin area of the vehicle. The parcel shelf may further include a soundproofing partition which may extend laterally between two distal end regions on the tray such that a region of the tray is partitioned into a forward region and a rearward region. The forward region may include a plurality of first openings, where each of the plurality of first openings is sealed to limit passage of sound from the trunk area into the cabin area through the forward region. The soundproofing partition may be configured such that the sound from the trunk area reaching the rearward region is redirected by the soundproofing partition along an extended sound pathway before entering the cabin area. A sound level of the sound entering the cabin area from the extended sound pathway may be reduced below a defined threshold level.

Another exemplary aspect of the disclosure provides a parcel shelf for a vehicle which may include a tray disposed between a trunk area and a cabin area of the vehicle. The parcel shelf may further include a soundproofing partition which may extend laterally between two distal end regions on the tray such that a region of the tray is partitioned into a forward region and a rearward region. The soundproofing partition may be arranged on the tray such that sound reaching the rearward region from the trunk area is redirected by the soundproofing partition along an extended sound pathway before entering to the cabin area. A sound level of the sound entering the cabin area from the extended sound pathway may be reduced below a defined threshold level. The parcel shelf may further include a tray cover disposed over the tray. The tray cover may include one or more openings for the redirected sound from the rearward region to reach the cabin area along the extended sound pathway.

According to one exemplary aspect of the disclosure, the soundproofing partition may provide a primary sound-redirecting member functioning to redirect sound on a first path of the extending pathway and the parcel shelf may also include one or more secondary sound-redirecting members disposed over the rearward region of the tray and arranged to further redirect the sound along additional paths of the extended pathway. One or more of the sound-redirecting members may be obliquely oriented with respect to the tray.

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

Figure 1:
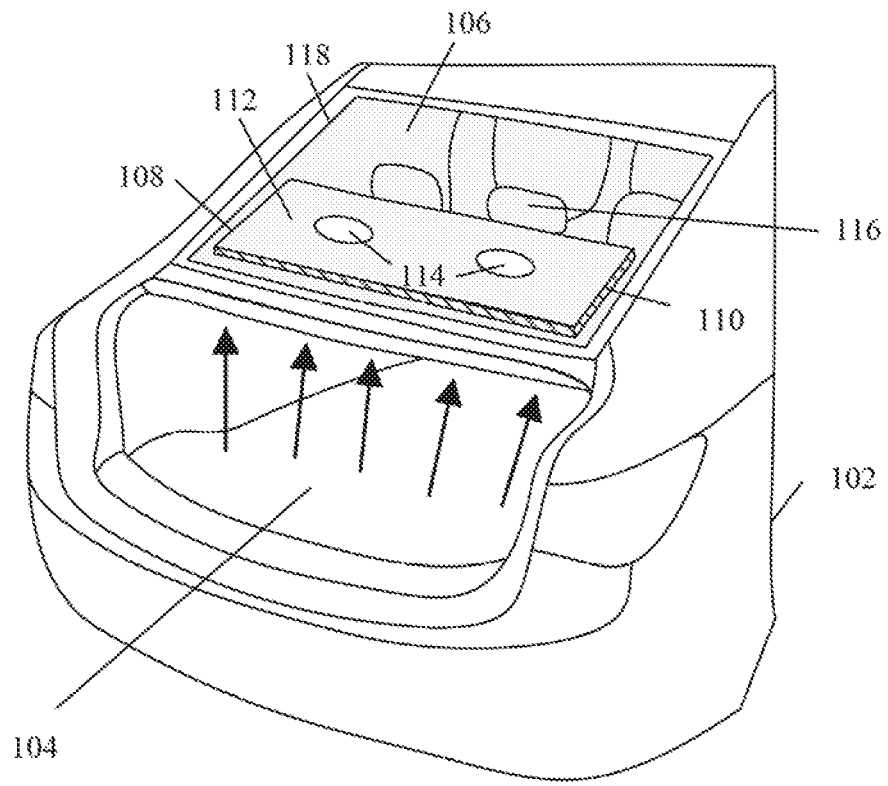
FIG. 1 illustrates a perspective view of a vehicle which includes a parcel shelf, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in the disclosed parcel shelf for a vehicle (such as sedan-type automobile) to limit transmission of noise from a trunk area of the vehicle into a cabin area of the vehicle. Exemplary aspects of the disclosure provide a parcel shelf, which provides a cost-effective technique and structure to control the transmission of sound between the trunk area and the cabin area of the vehicle. The disclosed parcel shelf includes a tray and a soundproofing partition (for example foam partition) which extends laterally on the tray such that the tray is partitioned into two regions as a forward region and a rearward region. The soundproofing partition is arranged such that the sound (i.e. transmitted from the trunk area) that reaches the rearward tray region is redirected by the soundproofing partition along an extended sound pathway before entering the cabin area. The extended sound pathway provides a tortuous path for the sound by which the sound travels a longer distance between the trunk area and the cabin area. Due to the longer distance travelled by the sound on the parcel shelf, a level of the sound is reduced below a defined threshold level by the time the sound enters the cabin area. The forward region of the parcel shelf includes one or more openings which are sealed by one or more soundproofing elements (e.g. a sticker or a plug) to limit the passage of the sound from the trunk area to the cabin area through the forward region. Thus, the disclosed parcel shelf provides a cost-effective technique to control sound transmission by using low cost soundproofing elements on the forward region and forming the extended sound pathway on the rearward region using the soundproofing partition. The disclosed parcel shelf does not require expensive sound deadening material or a sound deadening insulator layer as conventionally disposed on known parcel shelfs.

FIG. 1 illustrates a perspective view of a vehicle 102 including a parcel shelf, in accordance with an embodiment of the disclosure. The vehicle 102 may be a non-autonomous, a semi-autonomous, or an autonomous vehicle. Examples may include, but are not limited to, an electric vehicle, a hybrid vehicle, and/or a vehicle that uses a combination of one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The vehicle 102 may be sedan-type vehicle as shown in FIG. 1.

The vehicle 102 may include a trunk area 104, a cabin area 106, and a parcel shelf 108 disposed between the trunk area 104 and the cabin area 106. The parcel shelf 108 separates the cabin area 106 from the trunk area 104. The parcel shelf 108 may include a tray 110 and a tray cover 112 disposed over the tray 110. There is further shown a plurality of mounting brackets 114, which may support different components that may include, but are not limited to, a speaker, a lighting device, or a decorative device.

The sound transmitted to the cabin area from the trunk (see arrows in FIG. 1) may originate outside the trunk from road noise or vibrations generated by other vehicle components (e.g., chassis) during movement of the vehicle or may originate within the trunk by loose or rattling items carried in the trunk. The cabin area 106 may include a rear seat 116 which may carry an occupant. The occupant on the rear seat 116 or on a front seat of the vehicle 102 may be disturbed or distracted due to the sound which may be transmitted from the trunk area 104 during the movement of the vehicle 102. In FIG. 1, there is further shown a rear windshield 118 positioned behind the rear seat 116. The rear windshield 118 is disposed over the parcel shelf 108 in an inclined manner as shown in FIG. 1.

It should be noted that the sedan-type vehicle 102 shown in FIG. 1 is merely one example of a vehicle. The present disclosure may be also applicable to other types of vehicles having a trunk area and a cabin area separated by a parcel shelf. The vehicle 102 may include another component or parts to perform different functions of the vehicle 102. The description of the other components or parts of the vehicle 102 has been omitted from the disclosure for the sake of brevity.

Figure 2A:
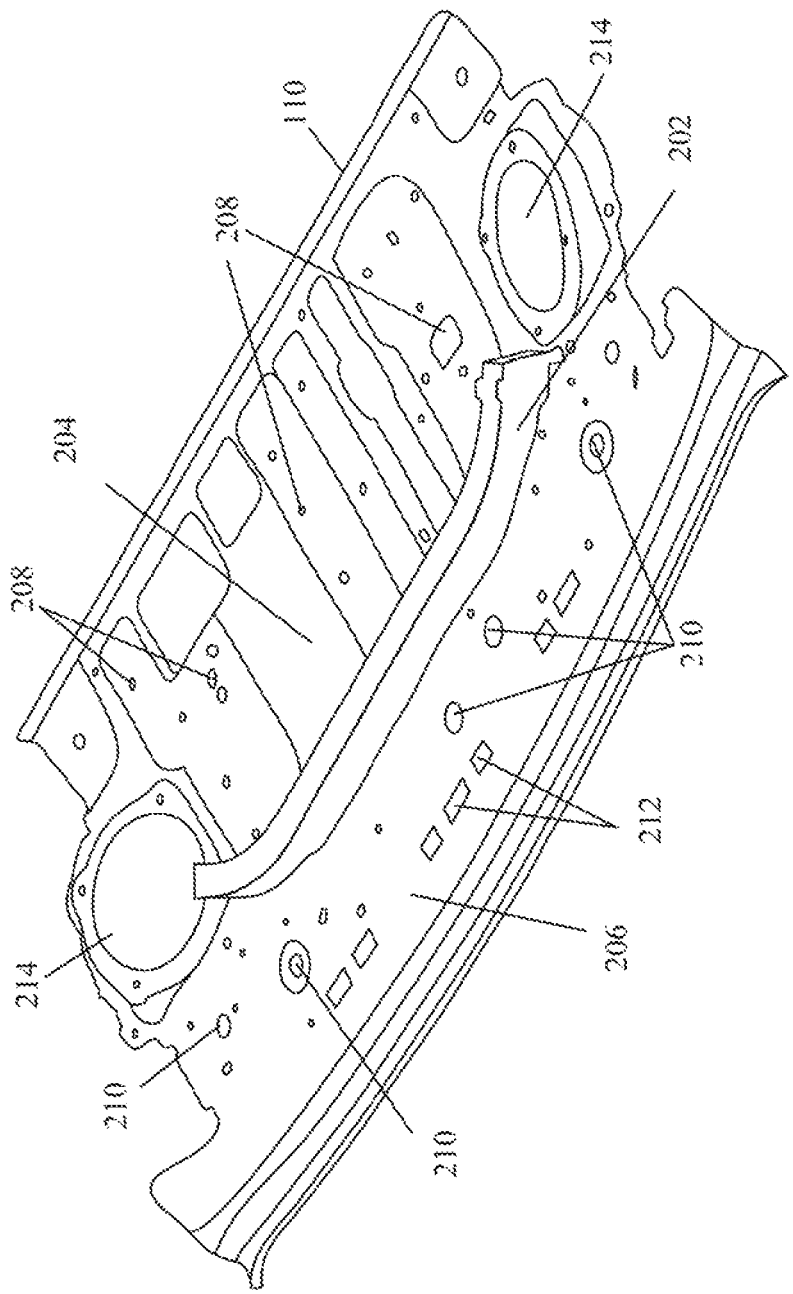
FIG. 2A illustrates a perspective view of the parcel shelf, in accordance with an embodiment of the disclosure.

FIG. 2A illustrates a perspective view of the parcel shelf, in accordance with an embodiment of the disclosure. FIG. 2A is explained in conjunction with elements from FIG. 1. As described above, the parcel shelf 108 includes a tray 110. In accordance with an embodiment, the tray 110 may be made of, but not limited to, a metallic material, a composite material, or non-metallic material. The tray 110 may be disposed between the trunk area 104 and the cabin area 106 of the vehicle 102. The tray 110 may include a soundproofing partition 202, a forward region 204, and a rearward region 206. The soundproofing partition 202 may be extended laterally between two distal end portions of the tray 110 such that the tray 110 may be partitioned into the forward region 204 and the rearward region 206 as shown in FIG. 2A. In the depicted embodiment, the soundproofing extends laterally between speaker mounting regions 214 provided at the distal end portions on the tray. As should be understood, the mounted speaker includes structure at the mounting region 214 of the tray 110 that is contacted or engaged by the soundproofing partition. The speaker structure also extends between the tray 110 and the tray cover 112 such that the sound that would otherwise travel through the distal end portion from the rearward region 206 to the forward region 204 is substantially blocked by the speaker structure. The soundproofing partition 202 may be an upstanding partition (as wall) or may include a wall extending upwardly from an upper surface of the tray 110. The soundproofing partition 202 may be clipped or sealed (i.e., using adhesive) to the tray 110. The soundproofing partition 202 may be integrally formed with the tray 110 or, alternatively, could be integrally formed with the tray cover 112 to extend downwardly from the cover towards the tray 110.

Figure 2B:
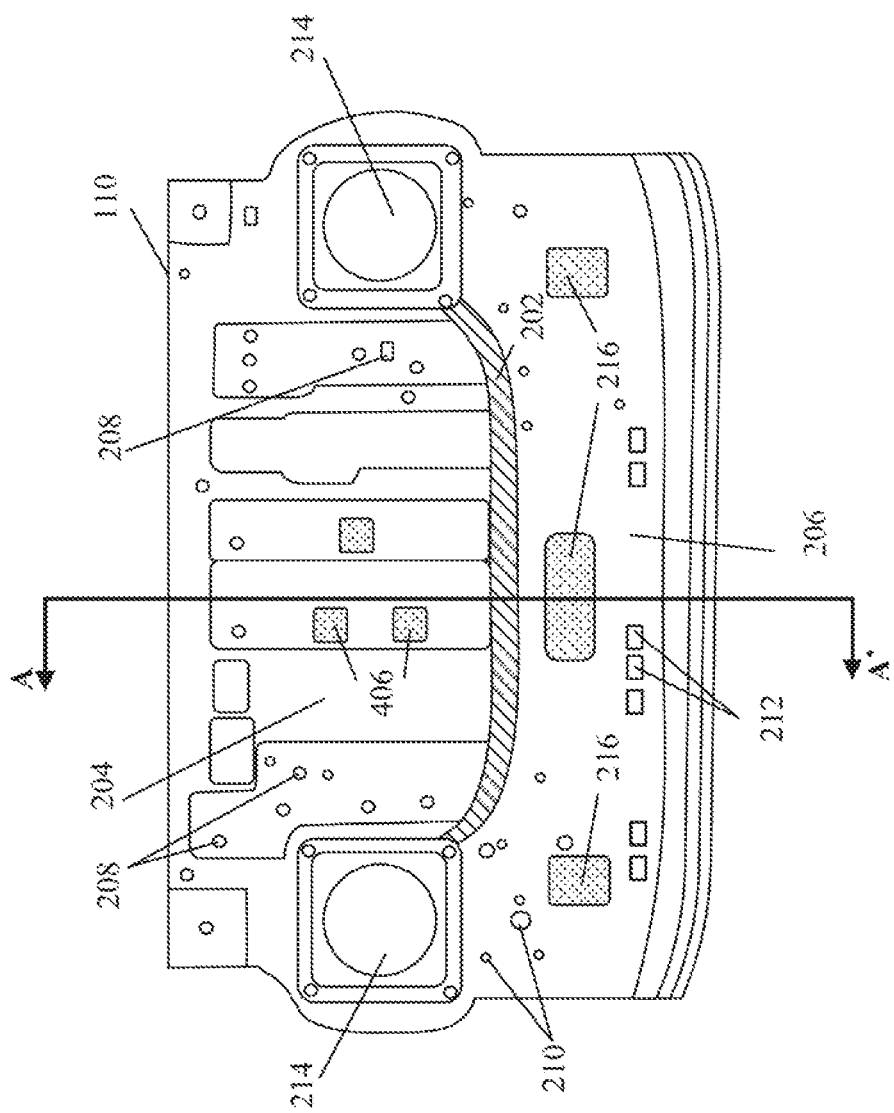
FIG. 2B illustrates a top view of the parcel shelf of FIG. 2, in accordance with an embodiment of the disclosure.
Figure 4:
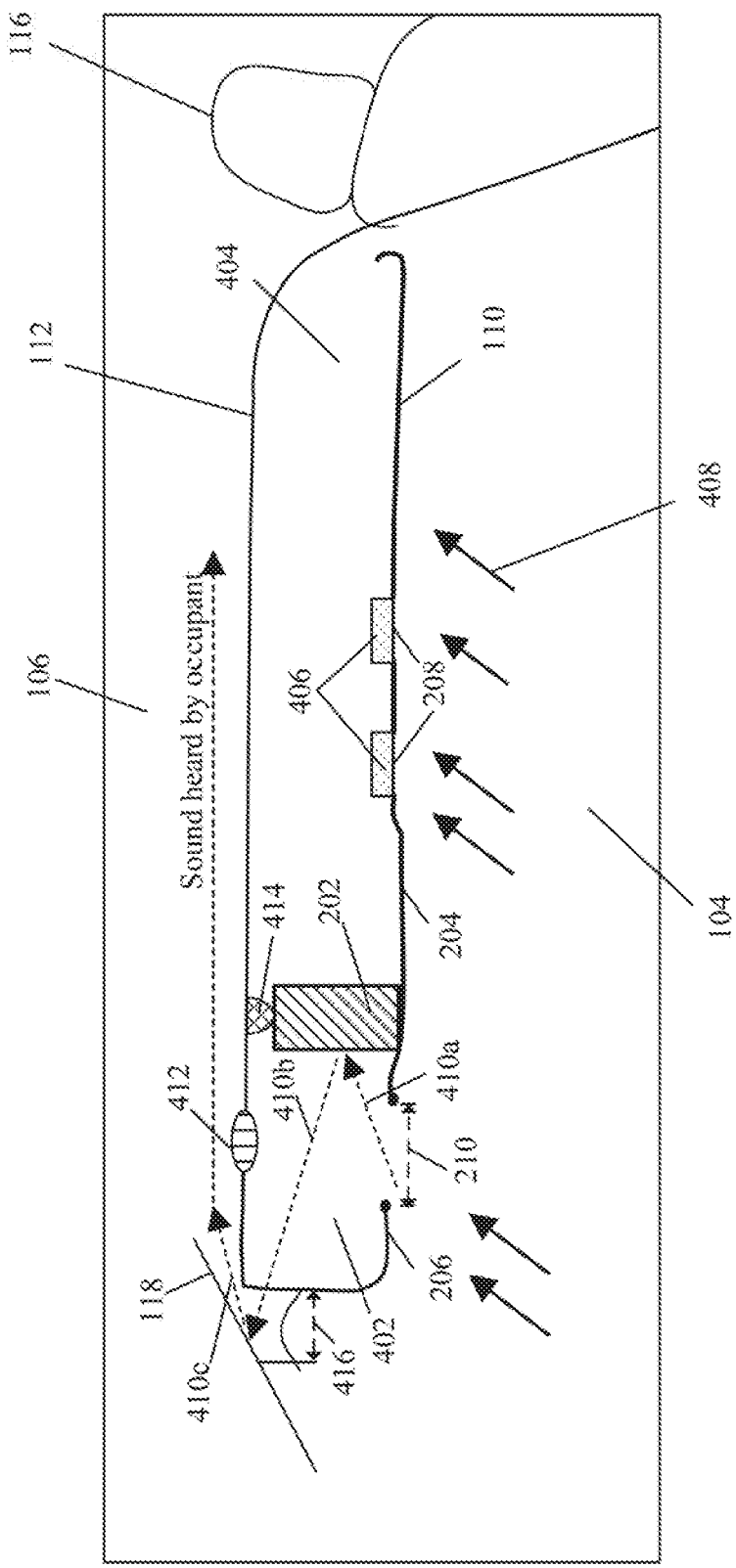
FIG. 4 illustrates a first sectional side view of the parcel shelf of FIGS. 2A and 2B, in accordance with an embodiment of the disclosure.

The forward region 204 may include a plurality of first openings 208. The plurality of first openings 208 may be sealed by a soundproofing member 406 (as shown in FIGS. 2B and 4). The soundproofing member 406 may limit the passage of the sound and the air from the trunk area 104 into the cabin area 106 through the forward region 204. The examples of the soundproofing member 406 may include, but are not limited to, a soundproofing sticker or a soundproofing plug. The usage of the soundproofing member 406 to seal the plurality of first openings 208 (which may be small in size) represents a potentially cost-effective way to control the movement of the sound between the trunk area 104 and the cabin area 106 as compared to the conventional techniques using the sound deadening layers/insulators or fabric cover lining uniformly applied over the entire surface area of the parcel shelf. Due to sealing of the plurality of first openings 208, the forward region 204 may be referred as a "no sound path area".

The rearward region 206 may include a plurality of second openings 210. The plurality of second opening 210 may or may not be sealed by any soundproofing member. Thus, the plurality of second openings 210 may allow the sound transmitted from the trunk area to enter a first space (shown in FIG. 4) defined above the rearward region 206 of the tray 110. Thus, the rearward region 206 may be referred as a "sound path area".

The soundproofing partition 202 may be formed of a dense foam material or a fabric material which may fully or partially absorb the sound present in the first space entered through the plurality of second openings 210 in the rearward region 206. The soundproofing partition 202 formed of the dense foam (or fabric) may prevent the passage of the sound from the first space into a second space (shown in FIG. 4) defined over the forward region 204 of the tray 110. In some embodiments, the soundproofing partition 202 may be made of a material such as, but not limited to, a plastic or a thinsulate-type material.

The soundproofing partition 202 may be arranged on the tray 110 such that the sound in the first space is redirected rearwardly by the soundproofing partition 202 along a first extended sound pathway. The first extended sound pathway formed in the first space over the rearward region 206 may be seen, for example, in FIG. 4.

In FIG. 2A, there is further shown a plurality of HVAC vents 212 in the rearward region 206. The plurality of HVAC vents 212 may allow the flow of air between the trunk area 104 and the cabin area 106. The plurality of HVAC vents 212 may also allow the passage of the sound from the trunk area 104 to the first space over the rearward region 206. Additionally, there may be other opening or vents on rearward region 206, for example for pressure equalization to facilitate door closing. These openings could also allow passage of sound and the air. There is further shown a pair of speaker mounting regions 214 each located in the distal end portions of the tray 110 adjacent opposite ends of the partition 202. Each of the speaker mounting regions 214 may be in contact with a respective end of the soundproofing partition 202 (as shown in FIG. 2B). The speaker mounting regions 214 on the tray 110 may be aligned with the mounting brackets 114 on the tray cover 112 to support a plurality of speaker devices (for example subwoofers).

With respect to FIG. 2B, there is shown a top view of the parcel shelf 108 depicted in FIG. 2A, in accordance with an embodiment of the disclosure. In FIGS. 2A and 2B, the tray 110 has a specific design indicating positions and/or shapes of the soundproofing partition 202, forward region 204, rearward region 206, the first openings 208, the second openings 210, the HVAC vents 212, and the speaker mounting regions 214. However, the disclosure is not be so limited and in some embodiments, the design of the tray 110 may be different from the one that has been illustrated in FIGS. 2A and 2B without a deviation from scope of the disclosure.

It should be noted that the tray 110 of the parcel shelf 108 shown in FIGS. 2A and 2B is merely an example. The present disclosure may be also applicable to other structure of the parcel shelf 108 of several types of vehicles. The parcel shelf 108 may include another component, parts, or vents, depending on different structure or design of the vehicles. The description of the other components, parts or vents on the tray 110 has been omitted from the disclosure for the sake of brevity.

Figure 3:
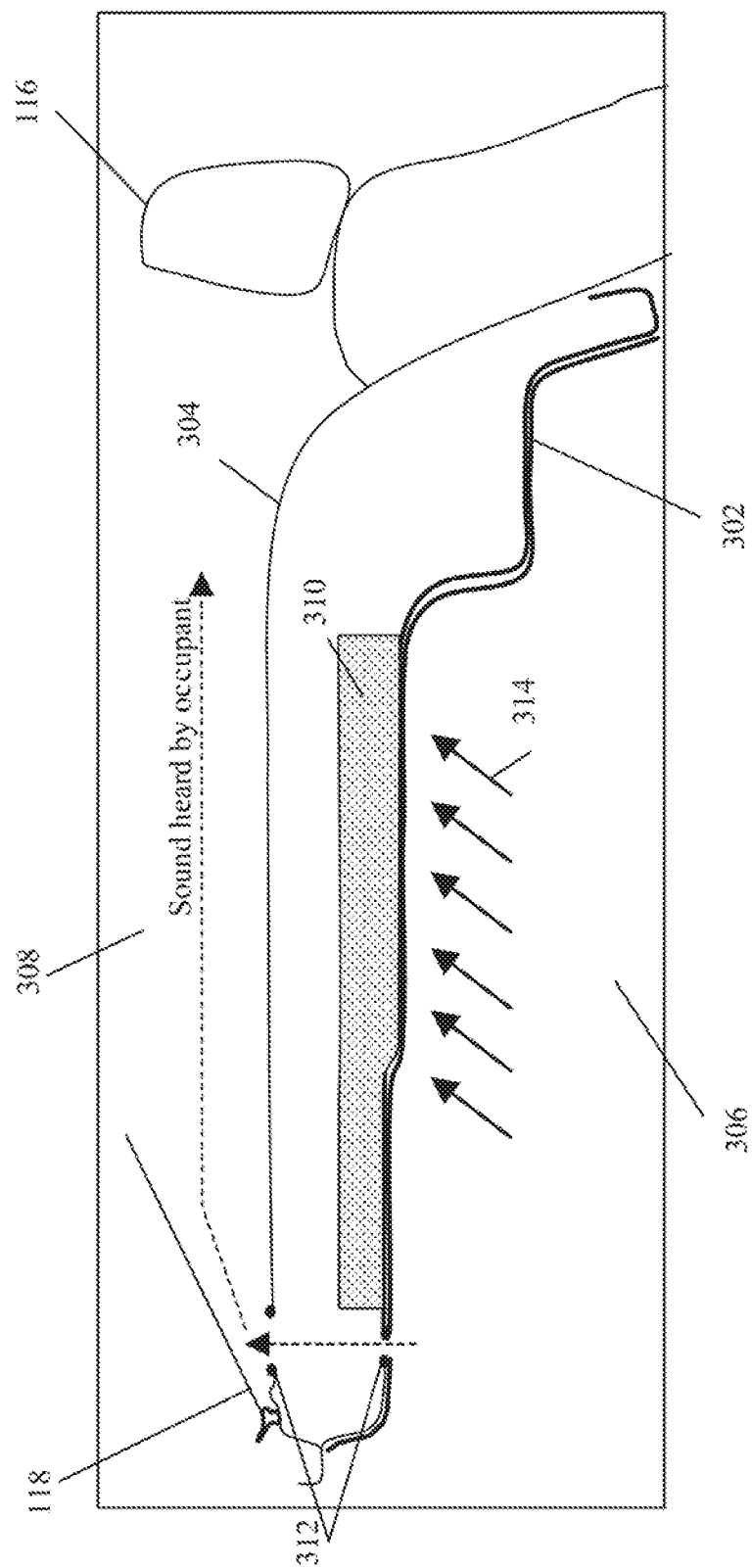
FIG. 3 illustrates a sectional side view of a conventional parcel shelf of a vehicle.

FIG. 3 illustrates a sectional side view of a conventional parcel shelf of a vehicle. The sectional side view may be a left side or right-side view of the conventional parcel shelf. With respect to FIG. 3, there is shown a tray 302 of the conventional parcel shelf. There is further shown a tray cover 304 disposed over the tray 302. The tray cover 304 may or may not be similar to the tray cover 112 of FIG. 1. There is further shown a trunk area 306 and a cabin area 308 of a vehicle separated by the combination of the tray 302 and the tray cover 304 of the conventional parcel shelf. The tray 302 and the tray cover 304 may include the HVAC vent 312 similar to one of the plurality of HVAC vents 212 indicated in FIG. 2A.

In FIG. 3, there is shown a sound deadening layer 310 (as a thinsulate-type material) disposed over the tray 302 to control the movement of the sound (indicated by arrows 314 in FIG. 3) from the trunk area 306 into the cabin area 308.

The sound deadening layer 310 may be uniformly applied over an entire surface area of the tray 302. In some cases, the sound deadening layer 310 covers a substantial surface area over the tray 302. Thus, due to usage of the sound deadening layer 310 of larger dimensions, the conventional parcel shelf technique may be quite expensive.

Further, as shown in FIG. 3, the HVAC vent 312 may not be covered by the sound deadening layer 310 and may allow the passage of air between the trunk area 306 and the cabin area 308. The HVAC vent 312 may allow the direct movement of the sound (as indicated by the arrows 314) from the trunk area 306 into the cabin area 308 of the conventional parcel shelf. Based on the direct movement of the sound, the conventional parcel shelf may not be effective enough to suppress the sound from the trunk area 306 and thus, may not be desired by the occupant present in the cabin area 308.

FIG. 4 illustrates a sectional side view of the parcel shelf of FIGS. 2A and 2B, in accordance with an embodiment of the disclosure. FIG. 4 is described in conjunction with elements from FIGS. 1, 2A, and 2B. The first sectional side view may be a right-side view of the parcel shelf 108 considered from a side indicated by line A-A' in FIG. 2B.

In FIG. 4, there is further shown the trunk area 104, the cabin area 106, the tray 110, the tray cover 112, and the rear windshield 118. The soundproofing partition 202, which partitions the tray 110 into the forward region 204 and the rearward region 206, is also shown. The tray cover 112 may be disposed between the tray 110 and the cabin area 106 such that both the forward region 204 and the rearward region 206 are covered by the tray cover 112. The tray cover 112 may be made from a plastic material. In some embodiments, the tray cover 112 may include a metallic material or a fabric material.

As discussed above, the forward region 204 may include the plurality of first openings 208. One or more of the first openings 208 may be sealed by a soundproofing member 406. In some embodiments, the small-sized soundproofing member 406 may be made of a sound deadening material (for example a thinsulate-type material) and may be applied over a sub-region of the forward region 204 of the tray 110 including one or more of the openings 208. Such a smaller-sized sound deadening material (or layer) applied over a region of the forward region may again be cost-effective as compared to the conventional parcel shelf in which large-size sound deadening material (or layer) is applied uniformly over the entire surface of the parcel shelf.

As discussed above, the rearward region 206 of the tray 110 may include the plurality of second openings 210. In some embodiments, one or more of the second openings 210 of the rearward region 206 may be sealed by a sound deadening member 216 (for example a small-size piece of a thinsulate-type material) as shown in FIG. 2B. Similar to the sound deadening members 406 of the forward region described above, the members 216 may include relatively small sized layers of a sound-deadening material (e.g., a thinsulate-type material) covering a portion of the rearward region including one or more of the openings 210. In some embodiments, the sound deadening material 216 may allow the passage of air from the set of openings of the rearward region 206, but may prevent the passage of the sound originated from the trunk area 104.

The soundproofing partition 202 may be disposed or arranged on an upper surface of the tray 110 such that the sound which enters the first space 402 may be directed towards the soundproofing partition 202 as indicated by a first directional path 410a. The sound indicated by the first directional path 410a is further redirected (or reflected) by the soundproofing partition 202 towards the rear windshield 118 as indicated by a second directional path 410b in FIG. 4. The redirection of the sound by the soundproofing partition 202 may depend on orientation of the soundproofing partition 202 with respect to the upper surface of the tray 110. For example, as shown in FIG. 4, the orientation of the soundproofing partition 202 with respect the tray 110 is 90 degrees, resulting in the sound in the first space 402 being redirected along the second directional path 410b. In case of any change in the orientation of the soundproofing partition 202 with respect to the upper surface of the tray 110, the redirected sound may have different direction than the depicted second directional path 410b.

As shown in FIG. 4, the sound redirected by the soundproofing partition 202 may be further redirected by the rear windshield 118 and may enter the cabin area 106 as indicated by a third directional path 410c. The redirected sound indicated by the second directional path 410b and the third directional path 410c may form a first extended sound pathway before entering the cabin area 106. Thus, a distance travelled by the sound from the trunk area 104 to the cabin area 106 as indicated the first extended sound pathway may be longer as compared to the distance travelled by the sound (indicated by the arrow 314) of the conventional parcel shelf shown in FIG. 3.

The extended sound pathway formed between the trunk area 104 and the cabin area 106 in the first space 402 over the rearward region 206 may provide a tortuous pathway for the sound. The tortuous pathway may serve to reduce the sound or noise level of the sound travelling in the first space 402 by increasing the distance that must be covered by the sound. In other words, the larger the distance covered by the sound along the sound pathway, the larger may be the reduction in the sound level before the sound enters the cabin area 106 (e.g., through an air vent 412 on the tray cover 112 or through a gap 416 between one end of the tray cover 112 and the rear windshield 118) as shown in FIG. 4.

In accordance with an embodiment, the sound level (in decibels dB) of the sound entering the cabin area 106 from the extended sound pathway (i.e., indicated by first directional path 410a, second directional path 410b, and third directional path 410c) may be lesser than a predefined threshold level (in dB). Thus, the disclosed parcel shelf 108 provides a reduction of the sound or noise between the trunk area 104 and the cabin area 106 with the use of the soundproofing partition 202 disposed on the rearward region 206.

With respect to FIG. 4, there is a shown a rib 414 (also sometimes referred as a "touch-off" rib) that extends from the tray cover 112 into a gap defined between the soundproofing partition 202 and the tray cover 112. The rib 414 may contact the soundproofing partition 202 at a distal end such that the passage of the sound from the first space 402 (defined over the rearward region 206) to the second space 404 (defined over the forward region 204) through the gap is blocked. Thus, the combination of the rib 414 and the soundproofing partition 202 limits the movement of the sound from the rearward region 206 (also referred to as the "sound path area") to the forward region 204 (also referred to as the "no sound path area").

Thus, the inclusion of the soundproofing members 406 sealing each of the openings 208 of the forward region 204, the soundproofing partition 202 redirecting sound along the extended sound pathway, and the rib 414 (if optionally included), may provide for effective sound suppression for the parcel shelf at reduced costs as compared to the conventional parcel shelf of FIG. 3.

In an alternative embodiment, the rib 414 (if included) may be extended from the tray cover 112 to an extent such that the extended rib 414 may be in contact with the tray 110, thereby replacing the soundproofing partition. In other words, the sound partitioning member could be provided a rib integrally extending from the tray cover to the tray without the need for a separate wall to partition the tray 110.

Figure 5:
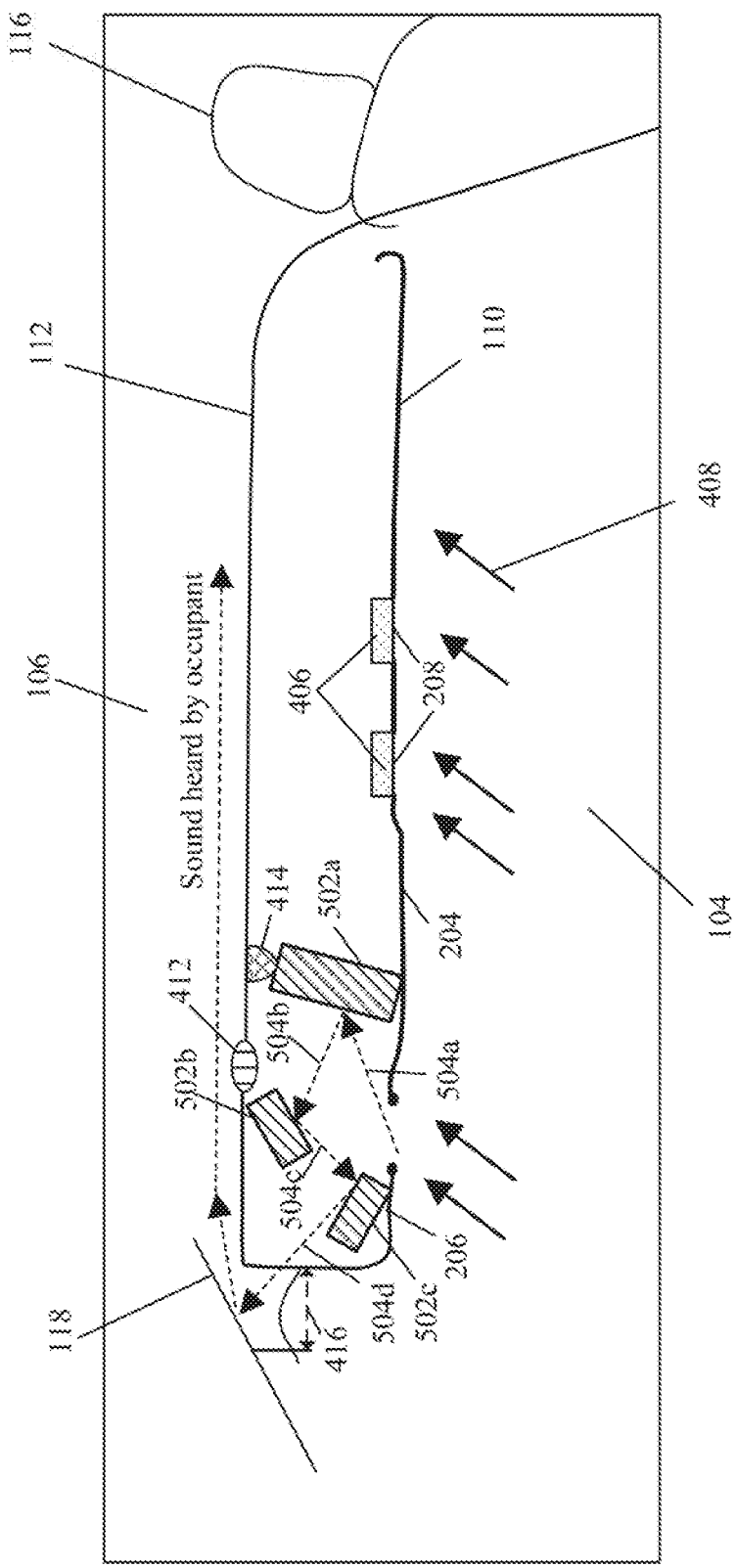
FIG. 5 illustrates a second sectional side view of the parcel shelf which includes a plurality of soundproofing partitions, in accordance with an embodiment of the disclosure.

FIG. 5 illustrates a sectional side view of a parcel shelf according to an exemplary embodiment including a soundproofing partition 502a disposed on the tray 110. In an analogous manner as the soundproofing partition 202 of FIG. 4, the soundproofing partition extends laterally between distal end portions of the tray to partition the tray into a rearward region 206 and a forward region 208. As depicted, the shelf may also include a rib 414 extending downwardly from a tray cover 112 to contact the soundproofing partition 202 to limit passage of sound from the rearward region to the forward region. As shown in FIG. 5, the soundproofing partition functions to redirect sound along an extended pathway from a first path 504a to a second path 504b. As such, the soundproofing partition may also be referred to hereinafter as a "primary sound-redirecting member". The shelf may also include one or more secondary sound-redirecting members configured and arranged over the rearward region 206 of tray 110 to further redirect the sound along additional paths of the extended sound pathway. The parcel shelf depicted in FIG. 5 includes first and second sound-redirecting members 502b, 502c. The orientation (or tilt angle) of the soundproofing partition 502a and secondary sound-redirecting members 502b, 502c with respect to a surface of the rearward region 206 of tray 110 may differ from that of the others. As shown, one or more of the sound-redirecting members 502a-502c may be oriented obliquely with respect to tray 110. In the depicted embodiment, each of the sound-redirecting members 502a-502c is oblique to the tray 110. As shown in FIG. 5, due to the varying positions and orientations of the soundproofing partitions 502a-502c, the sound in the first space 402 may be redirected through a second extended sound pathway collectively formed by sound paths 504a-504d before entering the cabin area 106. The distance travelled by the sound along the second extended sound pathway may be larger as compared to the distance travelled by the sound along the first extended sound pathway described in FIG. 4. Thus, the second extended sound pathway may cause greater sound-suppression (i.e., larger reduction in sound levels) as compared to the first extended sound pathway of FIG. 4.

In accordance with an embodiment, the distance formed by the second extended sound pathway (or the sound suppression) may depend on the number of soundproofing partitions 502a-502c and/or the positions of the soundproofing partitions 502a-502c. More particularly, the larger the number of the soundproofing partitions 502a-502c, the greater may be the distance traveled by the sound from the trunk area 104 to the cabin area 106 and, therefore, the greater the resulting sound reduction.

In another embodiment, the amount of sound-suppression may depend on varying size (for example height) of the soundproofing partitions 502a-502c. For example, a first size (i.e., height) of the first soundproofing partition 502a may be different from a second size (i.e., height) of the second soundproofing partition 502b attached to the tray cover 112. More particularly, as shown in FIG. 5, the first size of the first soundproofing partition 502a may be larger than the second size of the second soundproofing partition 502b. As such, the first soundproofing partition 502a may redirect or absorb more sound as compared to the second soundproofing partition 502b.

Figure 6:
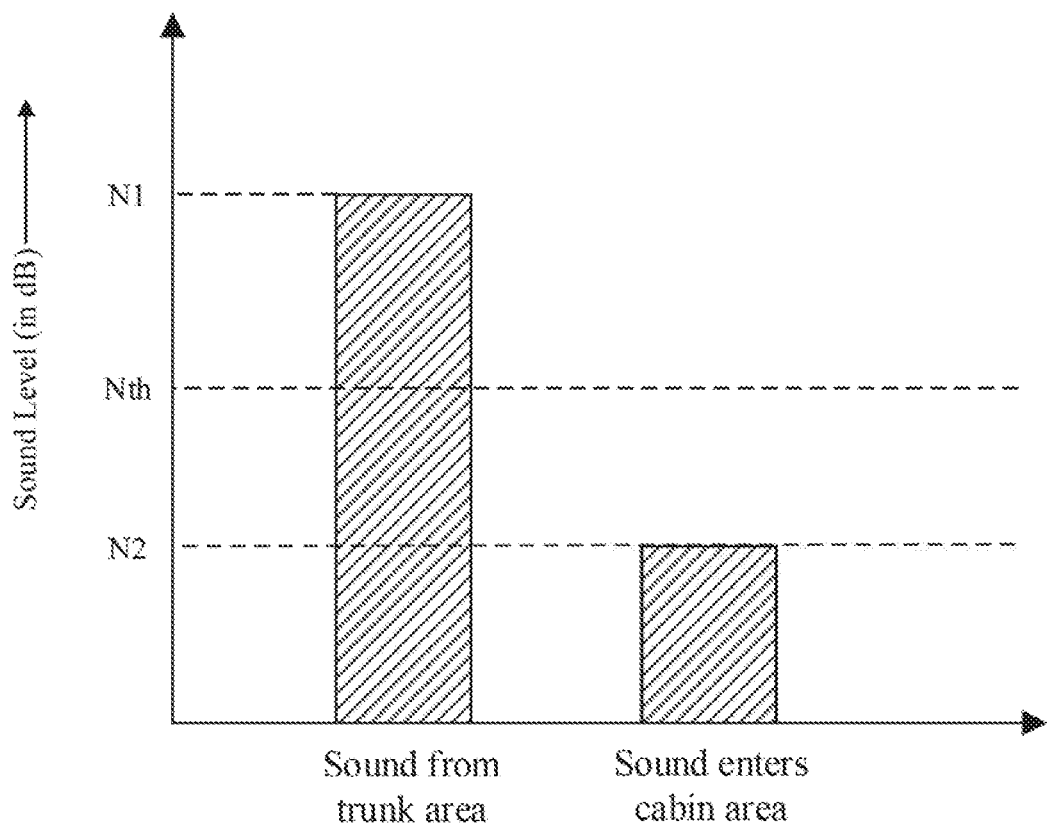
FIG. 6 illustrates a graph which depicts a comparison between a sound level in a trunk area of a vehicle and a resulting sound level transmitted to a cabin area of the vehicle through the parcel shelf of FIGS. 2A and 2B, in accordance with an embodiment of the disclosure.

FIG. 6 illustrates a graph which depicts a comparison between sound level in a trunk area of a vehicle and sound level entering a cabin area of the vehicle through a parcel shelf including the extended pathway construction of FIGS. 2A and 2B, in accordance with an embodiment of the disclosure. As shown in FIG. 6, the sound level (in dB) of the sound (noise) in the trunk area 104 of the vehicle is shown by a first level N1 and the sound level (in dB) of the sound (noise) entering the cabin area 106 is shown by a second level N2. As shown, the sound level entering the cabin is substantially reduced (approximately ⅓) in comparison to the sound level in the trunk and below a defined threshold level (Nth) of sound.

Figure 7:
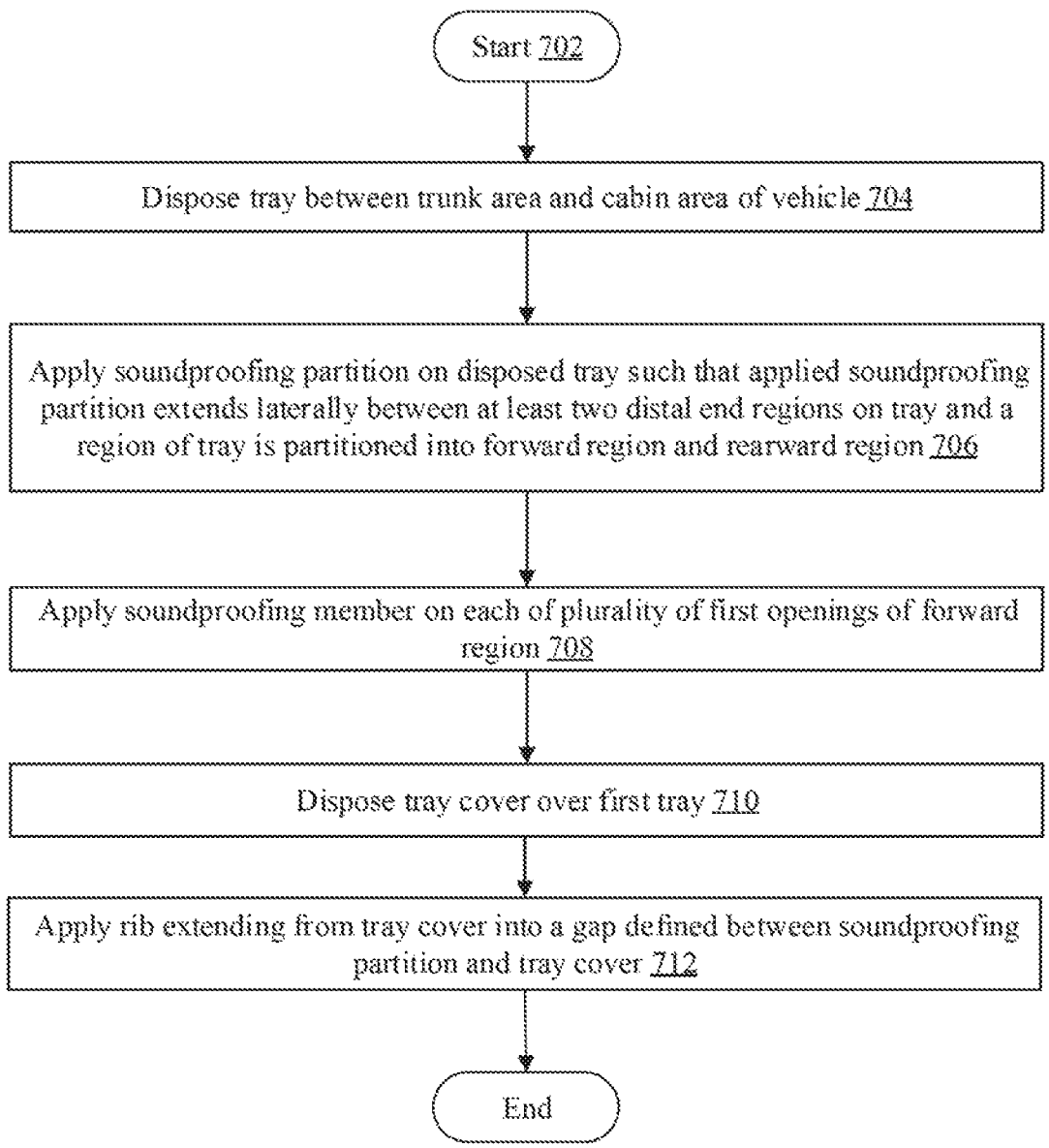
FIG. 7 is a flowchart that illustrates an exemplary operation for assembling a parcel shelf for a vehicle, in accordance with an embodiment of the disclosure.

FIG. 7 is a flowchart that illustrates an exemplary method for assembling/installing a parcel shelf for a vehicle, in accordance with an embodiment of the disclosure. The method includes steps 702 to 710

At step 704, the tray 110 is disposed between the trunk area 104 and the cabin area 106 of the vehicle 102.

At step 706, the soundproofing partition 202 is applied on the tray 110 such that the partition 202 extends laterally between the two distal end portions on the tray 110 to partition the tray 110 into the forward region 204 and the rearward region 206 as described in greater detail above, with respect to FIG. 2A.

At step 708, soundproofing members 406 may be applied over each of the first openings 208 of the forward region 204. The examples of the soundproofing member 406 may include, but are not limited to, a soundproofing sticker or a soundproofing plug.

At step 710, the tray cover 112 may be disposed over the tray 110. The combination of the tray 110 and the tray cover 112 may form the disclosed parcel shelf 108 between the trunk area 104 and the cabin area 106 of the vehicle 102.

At step 712, the rib 414 (if optionally included) extends from the tray cover 112 into a gap defined between the soundproofing partition 202 and the tray cover 112. The rib 414 may contact the soundproofing partition 202 such that passage of the sound from the rearward region 206 to the forward region 204 through the gap is limited.

It should be understood that the order of the steps may vary from that shown in FIG. 7 and described above. For example, the soundproofing partition 202 and the soundproofing members 406 may first be applied to the tray 110 (e.g., by the tray manufacturer) and the tray installed subsequently into the vehicle (by the vehicle manufacturer).

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Reference has been made in detail to specific aspects or features, examples of which are illustrated in the accompanying drawings. Wherever possible, corresponding or similar reference numbers have been used throughout to refer to the same or corresponding parts.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

The invention claimed is:

1. A parcel shelf for a vehicle, comprising:
    a tray disposed between a trunk area and a cabin area of a vehicle adjacent a rear windshield;
    a tray cover disposed over the tray to define a tray space between the tray and the tray cover; and
    a soundproofing partition extending laterally within the tray space between two distal end portions of the tray to define forward and rearward regions of the tray and to partition the tray space into a forward tray space and a rearward tray space,
    wherein the forward region includes a plurality of first openings and the rearward region includes at least one second opening, wherein each of the first openings is sealed to limit passage of sound from the trunk area into the forward tray space through the forward region, and wherein the second opening is unsealed to facilitate passage of sound from the trunk area into the rearward tray space,
    wherein the soundproofing partition is configured such that the sound from the trunk area reaching the rearward tray space through the rearward region is redirected rearwardly by the soundproofing partition along an extended sound pathway before entering the cabin area, and
    wherein a sound level of the sound entering the cabin area from the extended sound pathway is reduced below a defined threshold level.

2. The parcel shelf according to claim 1, wherein the tray is arranged to direct the sound to the rear windshield from the rearward tray space for forward redirection of the sound into the cabin from the rear windshield.

3. The parcel shelf according to claim 2, wherein the tray cover includes at least one third opening arranged for passage of the sound from the rearward tray space to the rear windshield.

4. The parcel shelf according to claim 3, wherein the tray comprises a metallic material or a composite material, and wherein the tray cover comprises a plastic material.

5. The parcel shelf according to claim 3, further comprising a rib extending from the tray cover into a gap defined between the soundproofing partition and the tray cover, wherein the rib contacts the soundproofing partition such that passage of the sound from the rearward region to the forward region through the gap is limited.

6. The parcel shelf according to claim 1, wherein the soundproofing partition comprises a dense foam material or a fabric material, capable of partially absorbing the sound.

7. The parcel shelf according to claim 1, wherein each of the distal end portions of the tray includes a speaker mounting region.

8. The parcel shelf according to claim 1, wherein the tray comprises one or more mounting brackets to support one or more components in each of the distal end portions, and wherein the one or more components are selected from the group including a speaker, a lighting device and decorative device.

9. The parcel shelf according to claim 1, wherein the soundproofing partition is a primary sound-redirecting member, the parcel shelf further comprising:
at least one secondary sound-redirecting member disposed within the rearward tray space and arranged such that sound redirected from the primary sound-redirecting member is further redirected by the secondary sound-redirecting member along the extended sound pathway before exiting the rearward tray space.

10. The parcel shelf according to claim 9, wherein at least one of the soundproofing partition and the secondary sound-redirecting member is oriented obliquely with respect to the tray.

11. The parcel shelf according to claim 10, wherein the soundproofing partition and each of the secondary sound-redirecting members is oriented obliquely with respect to the tray.

12. The parcel shelf according to claim 9, wherein the defined threshold level is based on the number and arrangement of the secondary sound-redirecting members.

13. The parcel shelf according to claim 1, further comprising a soundproofing member applied to each of the plurality of first openings of the forward region, wherein the soundproofing member is one of a soundproofing sticker or a soundproofing plug.

14. The parcel shelf according to claim 1, further comprising at least one layer of a sound deadening material applied over a sub-region of the forward region of the first tray.

15. A parcel shelf for a vehicle, comprising:
a tray disposed between a trunk area and a cabin area of a vehicle;
a tray cover disposed over the tray to define a tray space between the tray and the tray cover; and
a soundproofing partition extending laterally within the tray space between two distal end portions of the tray to define forward and rearward regions of the tray and to partition the tray space into a forward tray space and a rearward tray space,
wherein the tray is arranged such that sound transmitted to the rearward tray space from the trunk area is redirected by the soundproofing partition along an extended sound pathway before entering the cabin area, and
wherein a sound level of the sound entering the cabin area from the extended sound pathway is reduced below a defined threshold level,
and wherein the tray cover includes a rib extending from a surface of the tray cover to contact the soundproofing partition such that passage of sound from the rearward tray space to the forward tray space is limited.

16. A parcel shelf for a vehicle comprising:
a tray disposed between a trunk area and a cabin area of a vehicle; and
a soundproofing partition extending laterally between two distal end portions of the tray to define forward and rearward regions of the tray and to partition a tray space above the tray into a forward tray space and a rearward tray space, the rearward region of the tray including at least one opening permitting passage of sound from the trunk area into the rearward tray space, and
first and second secondary sound-redirecting members disposed within the rearward tray space, wherein the soundproofing partition is located forwardly of the opening, the first secondary sound-redirecting member is located above the opening, and the second secondary sound-redirecting member is located rearwardly of the opening, the soundproofing partition and the secondary sound-redirecting members arranged such that sound entering the space from the trunk area through the opening is redirected in a rearward direction within the rearward tray space from the soundproofing partition along a zig-zag pathway.

17. The parcel shelf according to claim 9, wherein the at least one secondary sound-redirecting member includes a first secondary sound-redirecting member and a second secondary sound-redirecting member.

18. The parcel shelf according to claim 17, wherein the primary sound-redirecting member is located forwardly of the second opening of the rearward region, the first secondary sound-redirecting member is located above the second opening, and the second secondary sound-redirecting member is located rearwardly of the opening, the secondary sound-redirecting members arranged such that the sound traveling from the primary sound-redirecting member is directed by the secondary sound-redirecting members within the rearward tray space along a zig-zag pathway.

19. The parcel shelf according to claim 18, wherein each of the secondary sound-redirecting members is obliquely oriented with respect to the rearward region of the tray.

20. The parcel shelf according to claim 16, wherein the soundproofing partition and each of the secondary sound-redirecting members is obliquely oriented with respect to the rearward region of the tray.

* * * * *